United States Patent
Jaradi et al.

(10) Patent No.: US 10,611,281 B1
(45) Date of Patent: Apr. 7, 2020

(54) RESTRAINT SYSTEM

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Zhenyan Gao, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 16/156,614

(22) Filed: Oct. 10, 2018

(51) Int. Cl.
| | |
|---|---|
| *B60N 2/68* | (2006.01) |
| *B60R 22/26* | (2006.01) |
| *B60R 22/36* | (2006.01) |
| *B60R 22/02* | (2006.01) |
| *B60R 22/18* | (2006.01) |

(52) U.S. Cl.
CPC .............. *B60N 2/688* (2013.01); *B60R 22/26* (2013.01); *B60R 22/023* (2013.01); *B60R 22/36* (2013.01); *B60R 2022/1825* (2013.01)

(58) Field of Classification Search
None
See application file for complete search history.

(56) References Cited

U.S. PATENT DOCUMENTS

| | | | |
|---|---|---|---|
| 6,290,299 B1* | 9/2001 | Frisch ................. | B60N 2/0232 297/410 |
| 7,314,235 B2* | 1/2008 | Downey ............... | B60R 22/024 280/808 |
| 8,820,790 B2 | 9/2014 | Wenz et al. | |
| 9,308,849 B2 | 4/2016 | Basters et al. | |
| 10,391,898 B1* | 8/2019 | Richards ................ | B60R 22/02 |
| 2008/0157576 A1* | 7/2008 | Chen .................... | B60N 2/2812 297/250.1 |
| 2013/0341993 A1* | 12/2013 | Kennington .......... | B60R 22/105 297/464 |
| 2016/0129878 A1* | 5/2016 | Denninger ............. | B60R 22/24 297/475 |
| 2018/0354456 A1* | 12/2018 | Tegen ................... | B60R 22/023 |
| 2019/0070983 A1* | 3/2019 | Sumroy ............... | B60N 2/2803 |

FOREIGN PATENT DOCUMENTS

| | | | |
|---|---|---|---|
| CN | 202656899 U | 1/2013 | |
| EP | 1440840 A2 | 7/2004 | |
| FR | 2861354 A1 * | 4/2005 | ........... B60R 22/023 |
| FR | 3009259 B1 | 12/2016 | |
| WO | 2018101019 A1 | 6/2018 | |

\* cited by examiner

*Primary Examiner* — David E Allred
(74) *Attorney, Agent, or Firm* — Frank A. MacKenzie; Bejin Bieneman PLC (57) ABSTRACT

A restraint system includes a seatback frame, a webbing guide attached to the seatback frame, webbing extending from below the seatback frame through the webbing guide, and a tether attached to the webbing and retractable to the seatback frame above the webbing guide. The restraint system may include a roller coupled to the seatback frame above the webbing guide, and the tether is at least partially wound around the roller.

14 Claims, 8 Drawing Sheets

RESTRAINT SYSTEM

BACKGROUND

Automobiles include restraint systems for occupants. The most common restraint system is a three-point harness, meaning that webbing is attached at three points around the occupant when fastened: an anchor, a retractor, and a buckle. The buckle is typically located on one side of a seat bottom. The anchor is typically located on the other side of the seat bottom than the buckle and attaches one end of the webbing to the seat bottom. The other end of the webbing feeds into the retractor, includes a spool that extends and retracts the webbing. The webbing typically extends through a webbing guide on the way to the retractor, and the webbing guide is typically located at a top of a seatback or on a pillar of the vehicle above the top of the seatback. A tongue slides freely along the webbing and, when engaged with the buckle, divides the webbing into a lap band and a shoulder band.

DETAILED DESCRIPTION

A restraint system includes a seatback frame, a webbing guide attached to the seatback frame, webbing extending from below the seatback frame through the webbing guide, and a tether attached to the webbing and retractable to the seatback frame above the webbing guide.

The restraint system may further include a ring attached to the tether, and the webbing may extend slidably through the ring.

The restraint system may further include a roller coupled to the seatback frame above the webbing guide, and the tether may be at least partially wound around the roller. The restraint system may further include a spring coupled to the roller, and the tether may be retractable by the roller to a retracted position, and the spring may be positioned to bias the roller to retract the tether to the retracted position.

The roller may be disposed less than one-fourth of a length of the seatback frame longitudinally from the top surface.

The restraint system may further include a floor and a retractor fixed to the floor, and the webbing may be retractable into the retractor, and a yield load of the retractor from the webbing may be greater than a yield load of the roller from the tether. The yield load of the retractor from the webbing may be at least ten times greater than the yield load of the roller from the tether.

The seatback frame may include two lateral sides opposite each other and a top surface extending from one of the lateral sides to the other of the lateral sides, and the restraint system may further include a head restraint attached to the seatback frame at the top surface, and the roller may be disposed on the top surface laterally between the head restraint and one of the lateral sides.

The seatback frame may include a top surface, and the webbing guide may be disposed at least one-fourth of a length of the seatback frame longitudinally from the top surface.

The restraint system may further include a seat-bottom frame and a hinge coupling the seat-bottom frame to the seatback frame, and the webbing guide may be disposed at least one-fourth of a length of the seatback frame longitudinally from the hinge.

The restraint system may further include a floor and a retractor fixed to the floor, and the webbing may be retractable into the retractor.

The webbing below the webbing guide may extend behind the seatback frame.

The restraint system may further include a seat-bottom frame hingedly coupled to the seatback frame, and an anchor fixed to the seat-bottom frame and to which the webbing extends. The restraint system may further include a tongue slidable along the webbing between the anchor and where the tether is attached to the webbing. The restraint system may further include a buckle fixed to the seat-bottom frame and engageable with the tongue, and the anchor and the buckle may be attached at opposing sides of the seat-bottom frame.

The restraint system may further include a seatback cover extending around the seatback frame and including a front panel, and the front panel may include a slit through which the webbing extends. The seatback cover may include a top panel, and the slit may be disposed at least one-fourth of a length of the seatback frame longitudinally from the top panel.

The restraint system may further include a seat-bottom frame and a hinge coupling the seat-bottom frame to the seatback frame, and the slit may be disposed at least one-fourth of a length of the seatback frame longitudinally from the hinge.

The seatback cover may be positioned to conceal the webbing guide.

With reference to the Figures, a restraint system 32 in a vehicle 30 includes a seatback frame 34, a webbing guide 36 attached to the seatback frame 34, webbing 38 extending from below the seatback frame 34 through the webbing guide 36, and a tether 40 attached to the webbing 38 and retractable to the seatback frame 34 above the webbing guide 36.

The restraint system 32 permits the webbing 38 to be positioned conveniently for an occupant before the occupant buckles in, and also allows the webbing guide 36 to be located at a low position. The tether 40 can pull the webbing 38 to a higher position than absent the tether 40, and the higher position can provide ease of access to the occupant when sitting in a seat 42 and reaching for the webbing 38. The low position of the webbing guide 36 may reduce chest deflection and shoulder band force during an impact, and may reduce twisting of the webbing 38 during an oblique impact.

Figure 1:
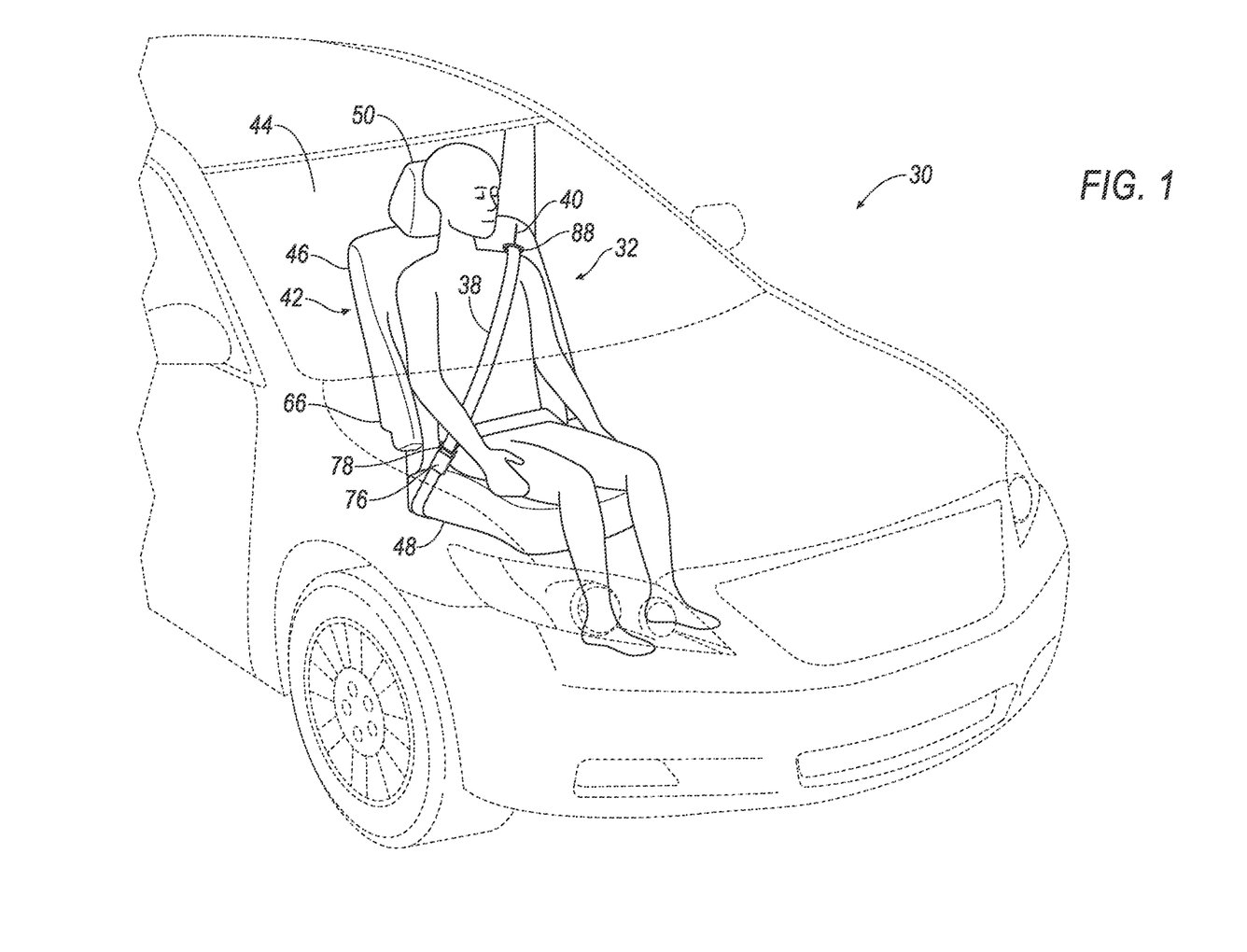
FIG. 1 is a perspective view of a passenger cabin including a seat.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 44 to house occupants, if any, of the vehicle 30. The passenger cabin 44 includes the seats 42 including one or more front seats 42 disposed at a front of the passenger cabin 44 and one or more back seats 42 disposed behind the front seats 42. The passenger cabin 44 may also include third-row seats 42 (not shown) at a rear of the passenger cabin 44. In FIG. 1, the seat 42 is shown to be a bucket seat, but the seats 42 may be bench seats or other types. The position and orientation of the seats 42 and components thereof may be adjustable by an occupant. While the restraint system 32 is discussed below with respect to a single seat, the restraint system 32 may be used for one, some, or all the seats 42 in the vehicle 30.

Figure 2:
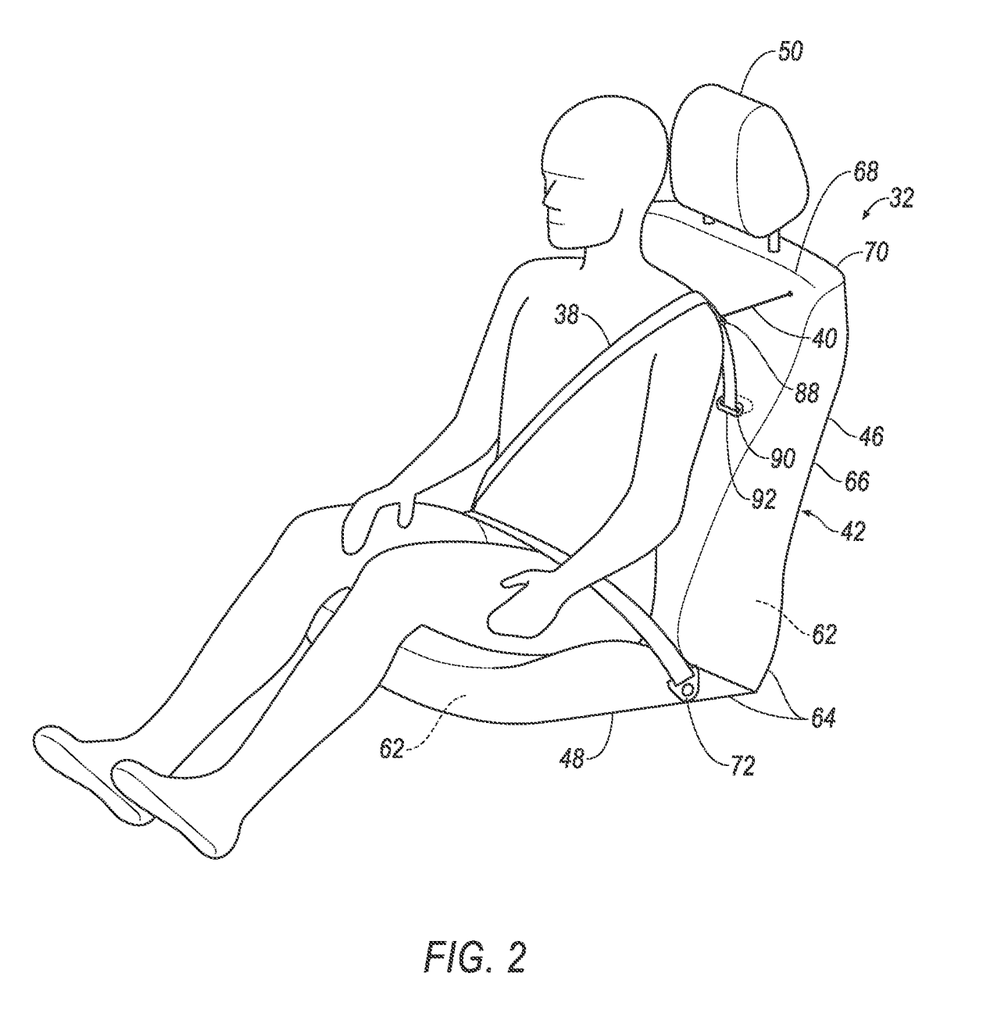
FIG. 2 is a perspective view of the seat.
Figure 3:
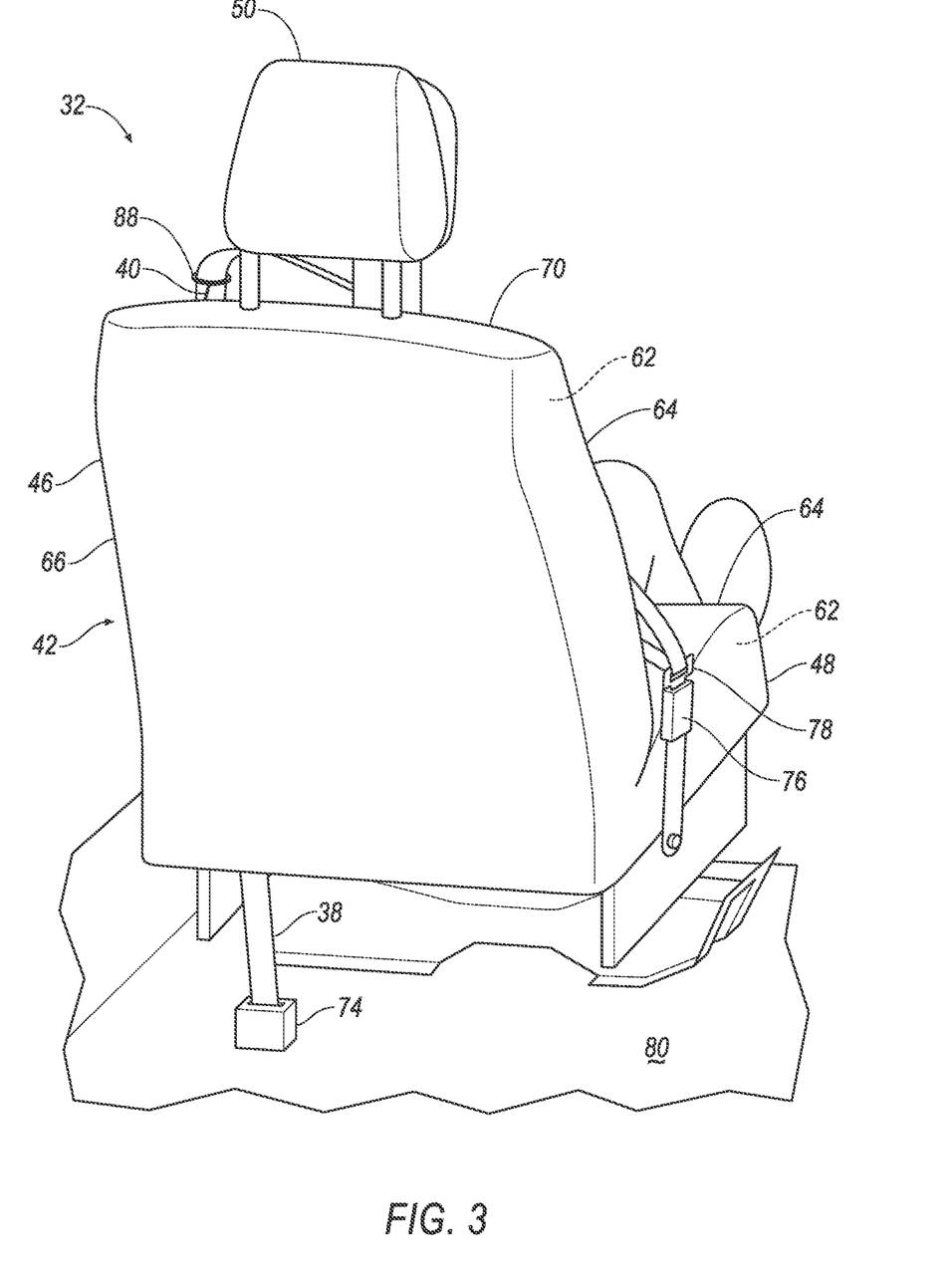
FIG. 3 is a rear perspective view of the seat.

With reference to FIGS. 2 and 3, the seat 42 may include a seatback 46, a seat bottom 48, and a head restraint 50. The head restraint 50 may be supported by the seatback 46 and may be stationary or movable relative to the seatback 46. The seatback 46 may be supported by the seat bottom 48 and may be stationary or movable relative to the seat bottom 48. The seatback 46, the seat bottom 48, and/or the head restraint 50 may be adjustable in multiple degrees of freedom. Specifically, the seatback 46, the seat bottom 48, and/or the head restraint 50 may themselves be adjustable, in other words, adjustable components within the seatback 46, the seat bottom 48, and/or the head restraint 50, and/or may be adjustable relative to each other.

Figure 4:
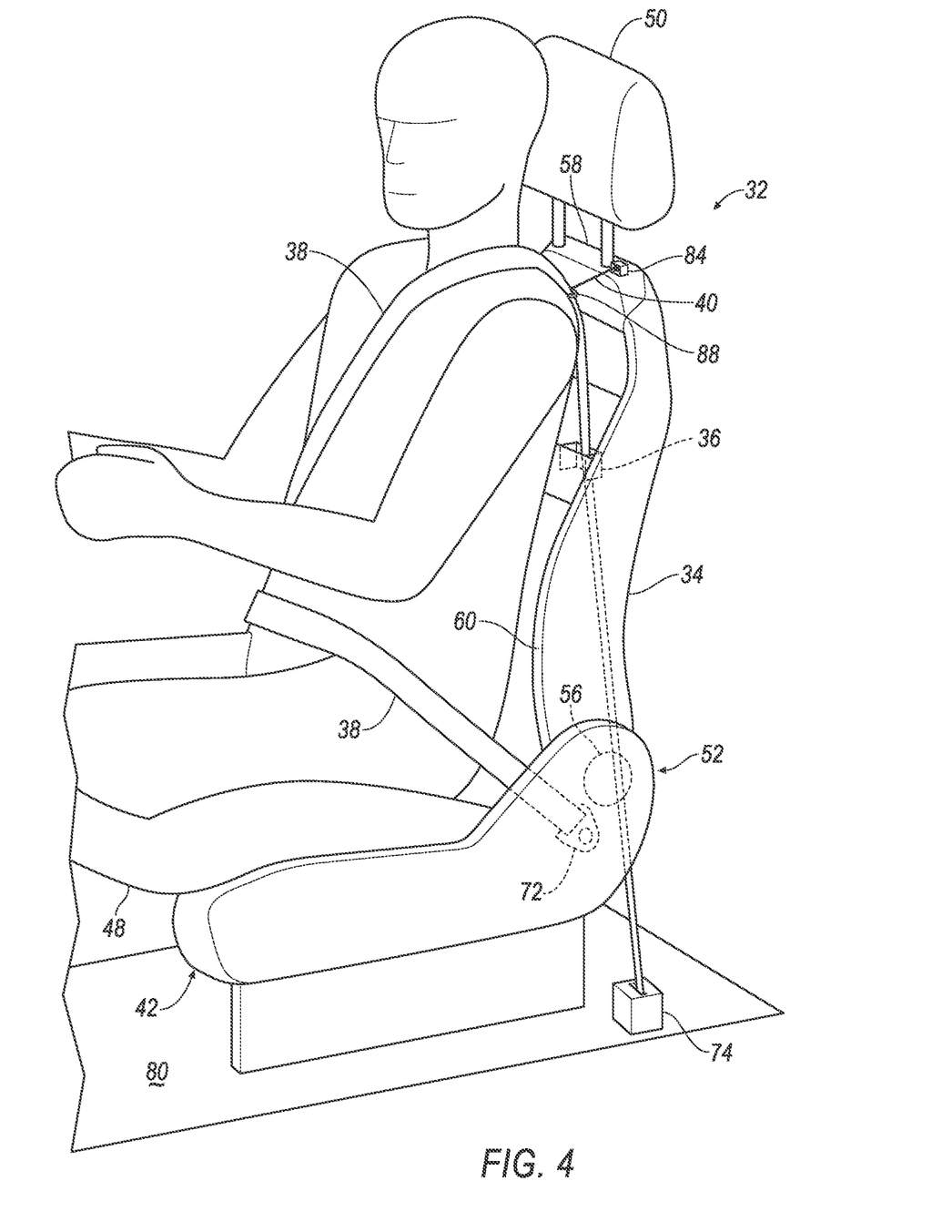
FIG. 4 is a perspective view of the seat with upholstery and cushions removed for illustration.
Figure 5:
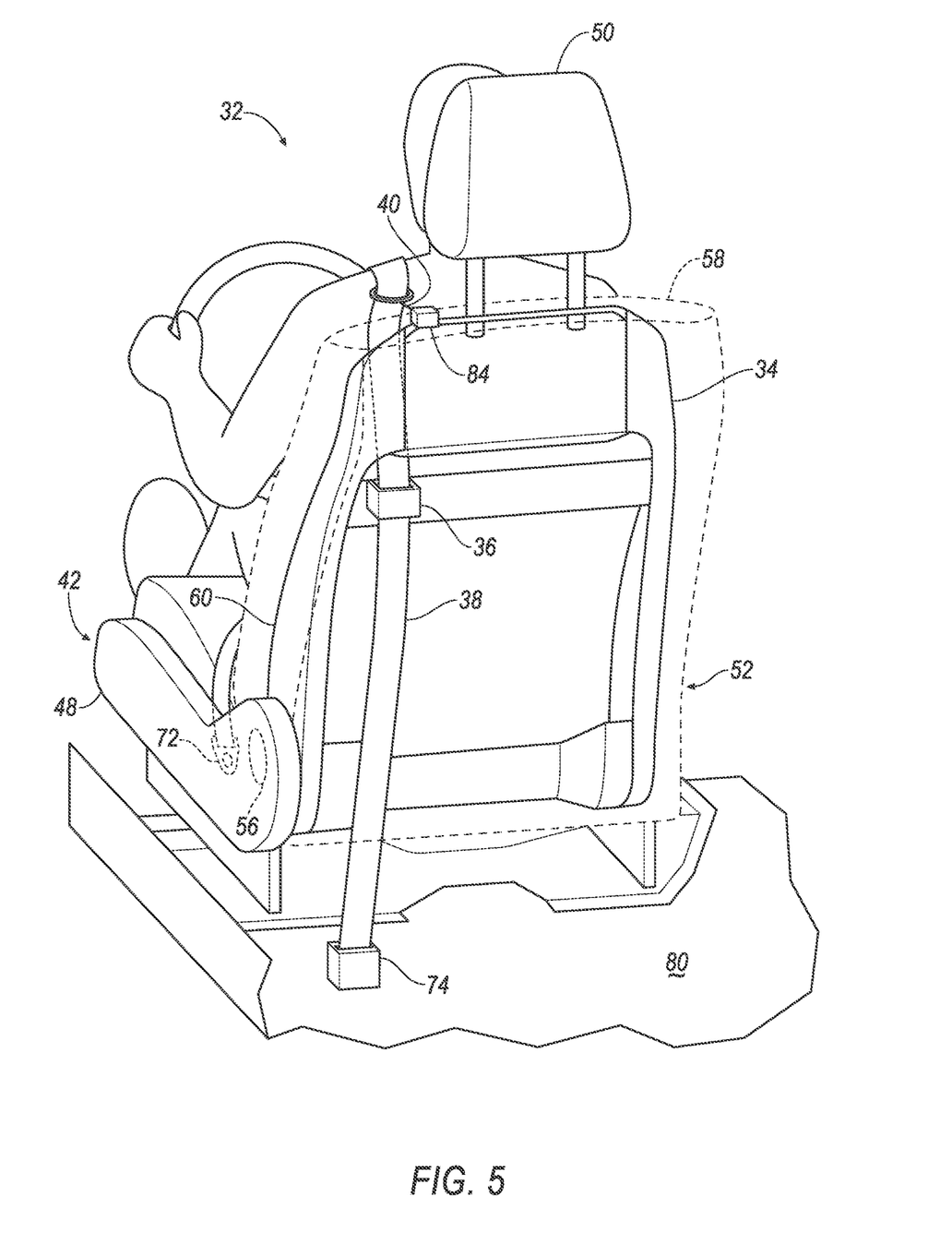
FIG. 5 is a rear perspective view of the seat with upholstery and cushions removed for illustration.

With reference to FIGS. 4 and 5, the seat 42 includes a seat frame 52. The seat frame 52 may include panels and/or may include tubes, beams, etc. The frame may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

The seat frame 52 includes the seatback frame 34 and a seat-bottom frame 54. A hinge 56 couples the seat-bottom frame 54 and the seatback frame 34 together. The hinge 56 permits the seatback frame 34 to rotate relative to the seat-bottom frame 54. The seatback frame 34 extends from the hinge 56 to a top surface 58. The seatback frame 34 includes two lateral sides 60 opposite each other. The top surface 58 extends from one of the lateral sides 60 to the other of the lateral sides 60. The head restraint 50 is attached to the top surface 58 between the lateral sides 60 and spaced from the lateral sides 60.

With reference to FIGS. 2 and 3, cushions 62 are supported on the seat frame 52. The cushions 62 may be made of cushioning material covered with upholstery 64. The cushioning material may be formed of foam or any other suitable supportive material. The upholstery 64 may be formed of cloth, leather, faux leather, or any other suitable material. The upholstery 64 may be stitched in panels around the foam. The seat bottom 48 includes the seat-bottom frame 54, one or more of the cushions 62 mounted on the seat-bottom frame 54, and upholstery 64 extending over the cushions 62. The seatback 46 includes the seatback frame 34, one or more of the cushions 62 mounted on the seatback frame 34, and a seatback cover 66 made of upholstery 64 extending over the cushions 62. The seatback cover 66 includes a front panel 68 positioned where a back of an occupant sitting in the seat 42 would rest, and a top panel 70 extending over the top surface 58 of the seatback frame 34.

An anchor 72 attaches one end of the webbing 38 to the seat frame 52, e.g., to the seat-bottom frame 54. The other end of the webbing 38 feeds into a retractor 74, which may include a spool that extends and retracts the webbing 38. The webbing 38 is retractable into the retractor 74. A buckle 76 is fixed to the seat-bottom frame 54, and the anchor 72 and the buckle 76 are attached at opposing lateral sides 60 of the seat-bottom frame 54. A tongue 78 is freely slidable along the webbing 38 between the anchor 72 and where the tether 40 is attached to the webbing 38, and the buckle 76 and the tongue 78 are engageable to lock the tongue 78 in the buckle 76. When engaged with the buckle 76, the tongue 78 divides the webbing 38 into a lap band and a shoulder band.

With reference to FIGS. 3-5, the retractor 74 is positioned below the seat 42.

Specifically, the retractor 74 may be fixed to a floor 80 of the passenger cabin 44 below the seat 42. The retractor 74 includes a spool around which the webbing 38 is wound and a spring biasing the spool to retract the webbing 38 (not shown). The retractor 74 may include an emergency locking mechanism and/or an automatic locking mechanism (not shown). The emergency locking mechanism locks to prevent extraction of the webbing 38 in response to a trigger such as sudden deceleration of the vehicle 30, sudden extraction of the webbing 38, or any other suitable trigger. The automatic locking mechanism has a load limit, that is, a maximum force in a direction of extraction of the webbing 38 beyond which the automatic locking mechanism allows payout even after locking, as is known. The automatic locking mechanism locks to prevent extraction of the webbing 38 in response to the webbing 38 being fully extended from the spool. The retractor 74 has a yield load from the webbing 38, i.e., a load in a direction of extraction of the webbing 38 at which the retractor 74 yields, which is greater than the load limit of the emergency locking mechanism of the retractor 74.

Figure 6:
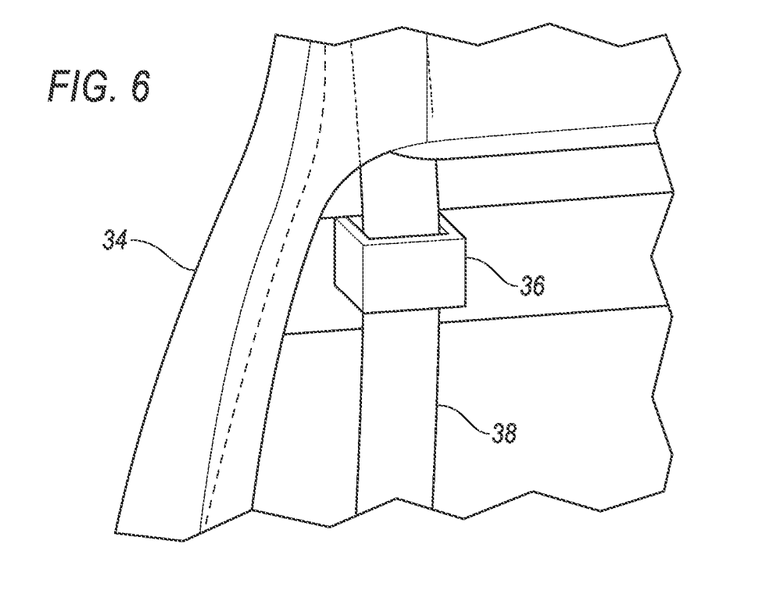
FIG. 6 is a rear perspective view of a portion of the seat with upholstery and cushions removed for illustration.

With reference to FIG. 6, the webbing guide 36 is attached to the seatback frame 34. The webbing guide 36 is disposed at least one-fourth of a length of the seatback frame 34 longitudinally from the top surface 58, and the webbing guide 36 is disposed at least one-fourth of a length of the seatback frame 34 longitudinally from the hinge 56. The seatback cover 66 is positioned to conceal the webbing guide 36; i.e., the seatback cover 66 blocks occupants in the passenger cabin 44 from seeing the webbing guide 36. The webbing guide 36, possibly with the seatback frame 34, defines a passage through which the webbing 38 passes; e.g., the webbing guide 36 may have a "C" shape attached to the seatback frame 34 so as to define a slot. The webbing guide 36 is positioned to accept webbing 38 extending up from behind the seatback frame 34, from which the webbing 38 can extend up and in front of the seatback frame 34.

Figure 7:
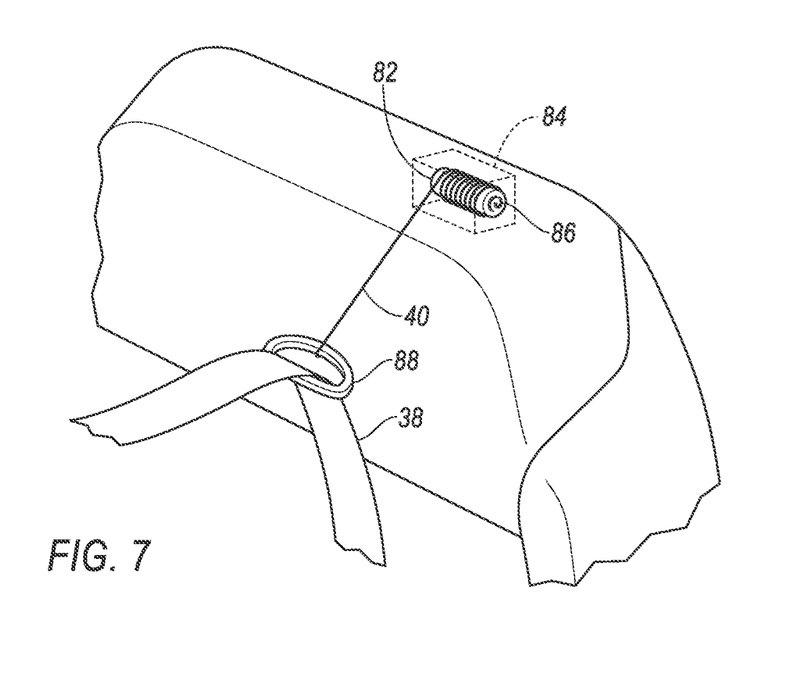
FIG. 7 is a perspective view of a portion of the seat with upholstery and cushions removed for illustration.

With reference to FIG. 7, a roller 82 is coupled to the seatback frame 34 above the webbing guide 36. The roller 82 is disposed less than one-fourth of a length of the seatback frame 34 longitudinally from the top surface 58. The roller 82 may be disposed on the top surface 58. The roller 82 is disposed laterally between the head restraint 50 and one of the lateral sides 60. The roller 82 is rotatable relative to the seatback frame 34. For example, the roller 82 may be disposed in a housing 84 that is fixed relative to the seatback frame 34.

The tether 40 is retractable to the seatback frame 34 above the webbing guide 36. The tether 40 is attached to and at least partially wound around the roller 82. Rotating the roller 82 in one direction allows extraction of the tether 40, and rotating the roller 82 in the other direction retracts the tether 40. The tether 40 may be a cord, i.e., have a round cross-section, such as synthetic rope; alternatively, the tether 40 may be formed of the same material and/or cross-sectional shape as the webbing 38.

A spring 86 is coupled to the roller 82 and to the seatback frame 34. The spring 86 is positioned to bias the roller 82 to retract the tether 40 to the retracted position, e.g., one end of the spring 86 fixed to the roller 82 and the other end of the spring 86 fixed to the housing 84. The spring 86 may be loaded in tension or compression when the tether 40 is fully retracted to a retracted position, and the spring 86 may be further loaded in either tension or compression when the tether 40 is extended from the roller 82. Thus, the spring 86 may exert a force tending to retract the tether 40. The spring 86 may be a spiral torsion spring or any other suitable type of spring.

A ring 88 is attached to the tether 40, and the webbing 38 extends slidably through the ring 88. The ring 88 may have a circular shape, or the ring 88 may have an elongated shape defining a slot sized for the cross-section of the webbing 38. When the roller 82 retracts the tether 40, the ring 88 is pulled closer to the top surface 58 of the seatback frame 34 and pulls the webbing 38 closer to the top surface 58 of the seatback frame 34.

The roller 82 and the spring 86 may be designed to pull the shoulder band of the webbing 38 higher along the seatback 46 for ease of access by an occupant when buckling in. In particular, the occupant may find locating the webbing 38 easier when the webbing 38 is raised above the height of the webbing guide 36. When the restraint system 32 is not buckled, the roller 82, the spring 86, and the ring 88 locate the webbing 38 at a height comparable to a conventional restraint system with a webbing guide 36 at a top of the seatback 46 or on a B pillar of the vehicle 30. The spring 86 may have a sufficient stiffness to pull the weight of the webbing 38 into the fully retracted position. The roller 82 and the spring 86 may lack strength to restrain an occupant during an impact. The yield load of the retractor 74 from the webbing 38 is greater, e.g., at least ten times greater, than a yield load of the roller 82 from the tether 40, i.e., a load in a direction of extraction of the tether 40 at which the roller 82 yields.

Returning to FIG. 2, the front panel 68 of the seatback cover 66 includes a slit 90 through which the webbing 38 extends. The slit 90 may be oriented substantially horizontally. The slit 90 may have a length slightly longer than a width of the webbing 38. The slit 90 may be disposed at a height near and slightly above the webbing guide 36. The slit 90 is disposed at least one-fourth of a length of the seatback frame 34 longitudinally from the top panel 70, and the slit 90 is disposed at least one-fourth of a length of the seatback frame 34 longitudinally from the hinge 56.

A bezel 92 is disposed in the slit 90. The bezel 92 may extend through the seatback cover 66 and through the cushion 62 for the seatback 46. The bezel 92 may be attached to the seatback cover 66 at the slit 92 with, e.g., stitching. The bezel 92 may be a rigid plastic such as polypropylene, acrylonitrile butadiene styrene (ABS), etc. The bezel 92 may have a tube shape and may define a slot through which the webbing 38 extends, the slot having a width slightly wider than the width of the webbing 38 and a height slightly taller than the thickness of the webbing 38.

With reference to FIGS. 2-5, the webbing 38 is retractably attached to the retractor 74; then extends behind the seatback frame 34 from below the seatback frame 34 to the webbing guide 36; then slidably extends through, in order, the webbing guide 36, the slit 90, the ring 88, and the tongue 78; and is fixedly attached at the anchor 72. The restraint system 32 is a three-point harness, meaning that the webbing 38 extends to three points around the occupant when the tongue 78 is fastened into the buckle 76: the anchor 72, the buckle 76, and the webbing guide 36. The lap band of the webbing 38 extends around the waist of the occupant from the anchor 72 to the buckle 76, and the shoulder band of the webbing 38 extends from the buckle 76 over one of the shoulders of the occupant to the webbing guide 36.

Figure 8:
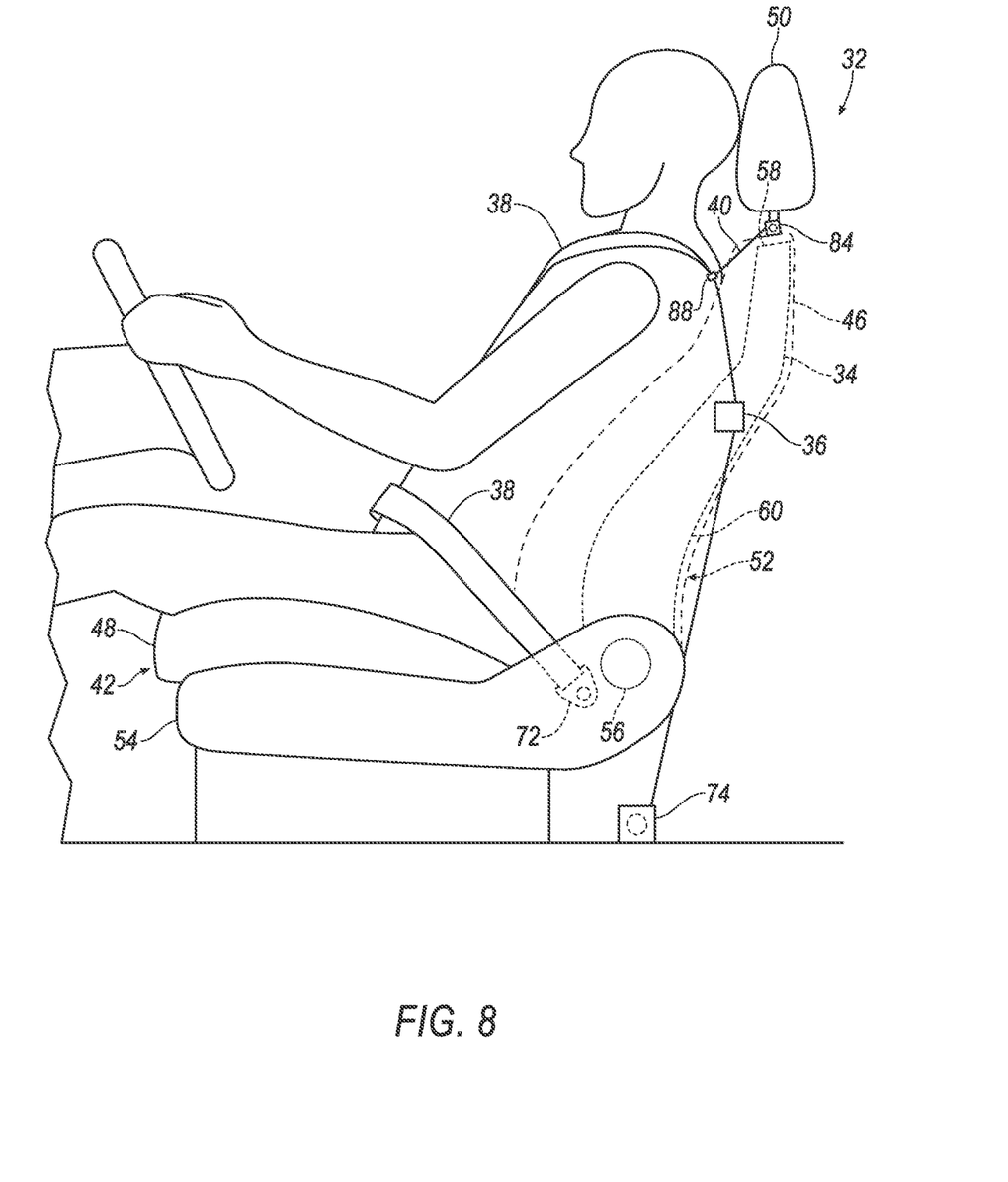
FIG. 8 is a side view of the seat with an occupant upright.
Figure 9:
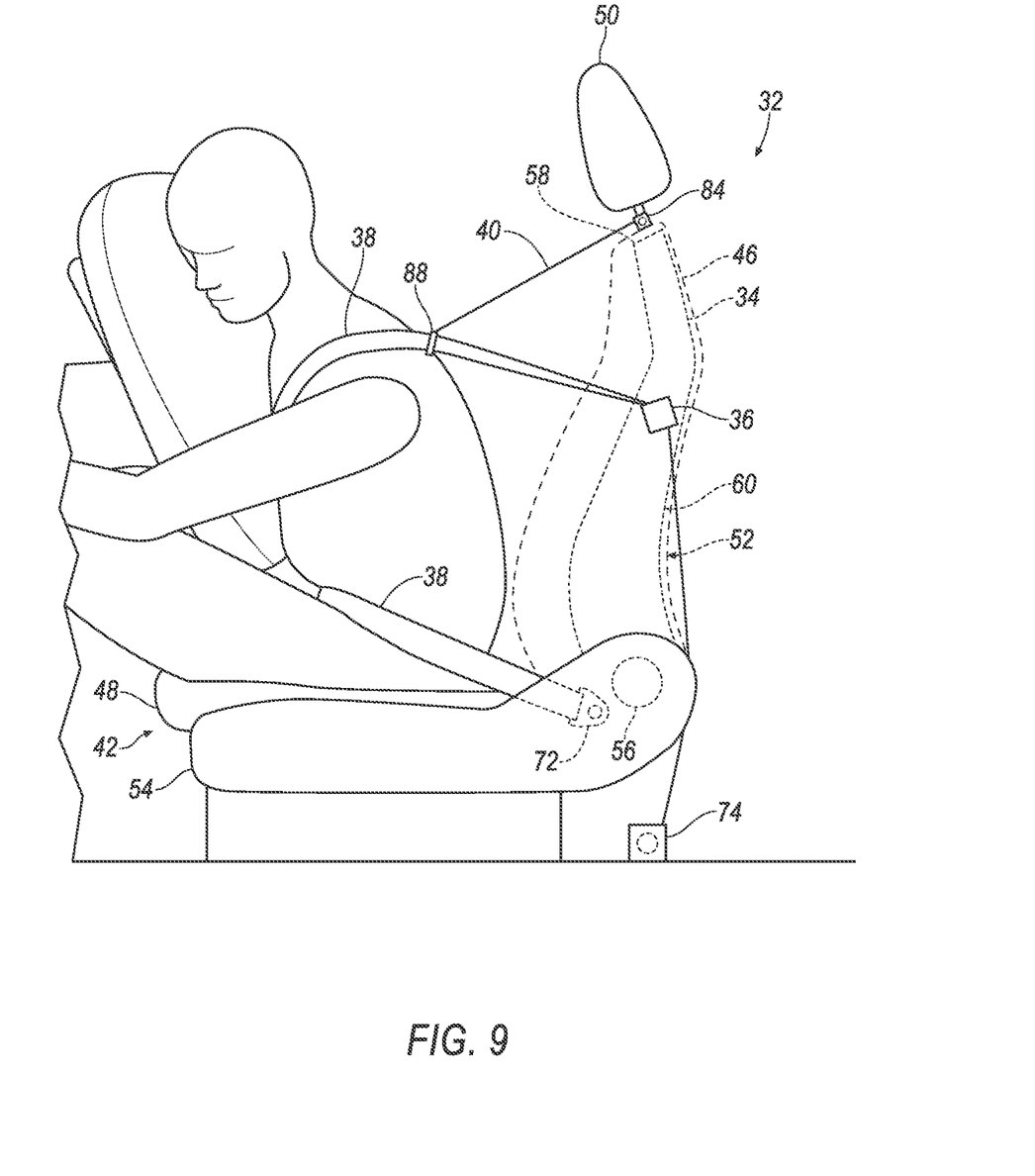
FIG. 9 is a side view of the seat with the occupant leaning forward.

With reference to FIGS. 8 and 9, in the event of an impact, the occupant sitting in the seat 42 may have forward and lateral momentum. The shoulder band of the webbing 38 is pulled by the torso of the occupant, and the emergency locking mechanism of the retractor 74 prevents further extraction of the webbing 38. The webbing guide 36 acts as the fulcrum about which the webbing 38 rotates as the webbing 38 is pulled by the torso. The webbing guide 36 is located below the height of the shoulder of most occupants. The position of the webbing guide 38 may make momentum of the occupant less likely to slip the occupant beneath the webbing 38. The force of the shoulder band of the webbing 38 is distributed along the chest as well as along the shoulder, which can provide low force on the chest and low chest deflection.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
a seatback frame;
a webbing guide attached to the seatback frame;
webbing extending from below the seatback frame through the webbing guide;
a tether attached to the webbing and retractable to the seatback frame above the webbing guide; a roller coupled to the seatback frame above the webbing guide, wherein the tether is at least partially wound around the roller; and
a spring coupled to the roller, wherein the tether is retractable by the roller to a retracted position, and the spring is positioned to bias the roller to retract the tether to the retracted position.

2. The restraint system of claim 1, further comprising a ring attached to the tether, wherein the webbing extends slidably through the ring.

3. The restraint system of claim 1, wherein the seatback frame includes a top surface, and the roller is disposed less than one-fourth of a length of the seatback frame longitudinally from the top surface.

4. The restraint system of claim 1, wherein the seatback frame includes two lateral sides opposite each other and a top surface extending from one of the lateral sides to the other of the lateral sides, the restraint system further comprising a head restraint attached to the seatback frame at the top surface, wherein the roller is disposed on the top surface laterally between the head restraint and one of the lateral sides.

5. The restraint system of claim 1, wherein the seatback frame includes a top surface, and the webbing guide is disposed at least one-fourth of a length of the seatback frame longitudinally from the top surface.

6. The restraint system of claim 1, further comprising a seat-bottom frame and a hinge coupling the seat-bottom frame to the seatback frame, wherein the webbing guide is disposed at least one-fourth of a length of the seatback frame longitudinally from the hinge.

7. The restraint system of claim 1, further comprising a floor and a retractor fixed to the floor, wherein the webbing is retractable into the retractor.

8. The restraint system of claim 1, wherein the webbing below the webbing guide extends behind the seatback frame.

9. The restraint system of claim 1, further comprising a seat-bottom frame hingedly coupled to the seatback frame, and an anchor fixed to the seat-bottom frame and to which the webbing extends.

10. The restraint system of claim 9, further comprising a tongue slidable along the webbing between the anchor and where the tether is attached to the webbing.

11. The restraint system of claim 10, further comprising a buckle fixed to the seat-bottom frame and engageable with the tongue, wherein the anchor and the buckle are attached at opposing sides of the seat-bottom frame.

12. A restraint system comprising:
a seatback frame;
a webbing guide attached to the seatback frame;
webbing extending from below the seatback frame through the webbing guide;
a tether attached to the webbing and retractable to the seatback frame above the webbing guide;
a seatback cover extending around the seatback frame and including a front panel, wherein the front panel includes a slit through which the webbing extends; and
a seatback cover extending around the seatback frame and including a front panel, wherein the front panel includes a slit through which the webbing extends;
wherein the seatback cover includes a top panel at an upper end of the seatback, and the slit is disposed at least one-fourth of a length of the seatback frame longitudinally from the top panel.

13. The restraint system of claim 12, further comprising a seat-bottom frame and a hinge coupling the seat-bottom frame to the seatback frame, wherein the slit is disposed at least one-fourth of a length of the seatback frame longitudinally from the hinge.

14. The restraint system of claim 12, wherein the seatback cover is positioned to conceal the webbing guide.

\* \* \* \* \*

UNITED STATES PATENT AND TRADEMARK OFFICE
CERTIFICATE OF CORRECTION

PATENT NO. : 10,611,281 B1
APPLICATION NO. : 16/156614
DATED : April 7, 2020
INVENTOR(S) : Dean M. Jaradi et al.

Page 1 of 1

It is certified that error appears in the above-identified patent and that said Letters Patent is hereby corrected as shown below:

In the Claims

Column 8, in Lines 4, 5 and 6, remove "a seatback cover extending around the seatback frame and including a front panel, wherein the front panel includes a slit through which the webbing extends;"

Signed and Sealed this
First Day of December, 2020

Andrei Iancu
*Director of the United States Patent and Trademark Office*